(12) United States Patent
Palumbo et al.

(10) Patent No.: US 6,404,336 B1
(45) Date of Patent: Jun. 11, 2002

(54) DISPLACEMENT SENSOR IN A SYSTEM SUITABLE FOR CONTROLLING MOVEMENTS AND ALARMS

(75) Inventors: Achille Palumbo; Renzo Previati, both of Casciago (IT)

(73) Assignee: Autotecnica S.r.L., Casciago (IT)

( * ) Notice: Subject to any disclaimer, the term of this patent is extended or adjusted under 35 U.S.C. 154(b) by 0 days.

(21) Appl. No.: 09/831,821

(22) PCT Filed: Nov. 10, 1999

(86) PCT No.: PCT/EP99/08612

§ 371 (c)(1),
(2), (4) Date: May 15, 2001

(87) PCT Pub. No.: WO00/29856

PCT Pub. Date: May 25, 2000

(30) Foreign Application Priority Data

Nov. 16, 1998 (IT) .......................................... MI98A2476

(51) Int. Cl.[7] .............................................. G08B 21/00
(52) U.S. Cl. ...................... 340/540; 340/673; 340/521; 340/429; 340/440; 340/467; 340/566; 340/555; 340/545.3; 340/545.5; 340/689; 200/61.52; 200/61.54 R
(58) Field of Search .................................. 340/540, 673, 340/521, 429, 440, 467, 566, 555, 545.3, 545.5, 689; 200/61.52, 61.54 R

(56) References Cited

U.S. PATENT DOCUMENTS 5,424,557 A * 6/1995 Rydborn ...................... 250/561
5,879,309 A * 3/1999 Johnson et al. .............. 600/552

FOREIGN PATENT DOCUMENTS

| EP | 0 141 294 | 5/1985 | .......... G08B/13/02 |
| EP | 0 152 817 | 8/1985 | .......... B60R/25/10 |
| WO | 93/06464 | 4/1993 | .......... G01N/21/84 |

* cited by examiner

Primary Examiner—Daniel J. Wu
Assistant Examiner—Tai T. Nguyen
(74) Attorney, Agent, or Firm—Young & Thompson

(57) ABSTRACT

The chamber (3) of the sensor (1) comprises a first and a second passage (16, 17) that communicate with the outside; a source of visible light (11) outside the chamber, through the first of the said passages (16), illuminates the interior of the chamber (3) and the spherical body (7) arranged inside it; an element sensitive to the quantity of light (9) outside the chamber to receive, through the second of the said passages (17), the light reflected from inside the chamber and electronic circuit that analyzes the electric signals correlated with the quantity of light seen by the said light-sensitive element (9) to generate at least one pulse that activates a movement control system of the means in which the sensor (1) is installed and an alarm system.

3 Claims, 2 Drawing Sheets

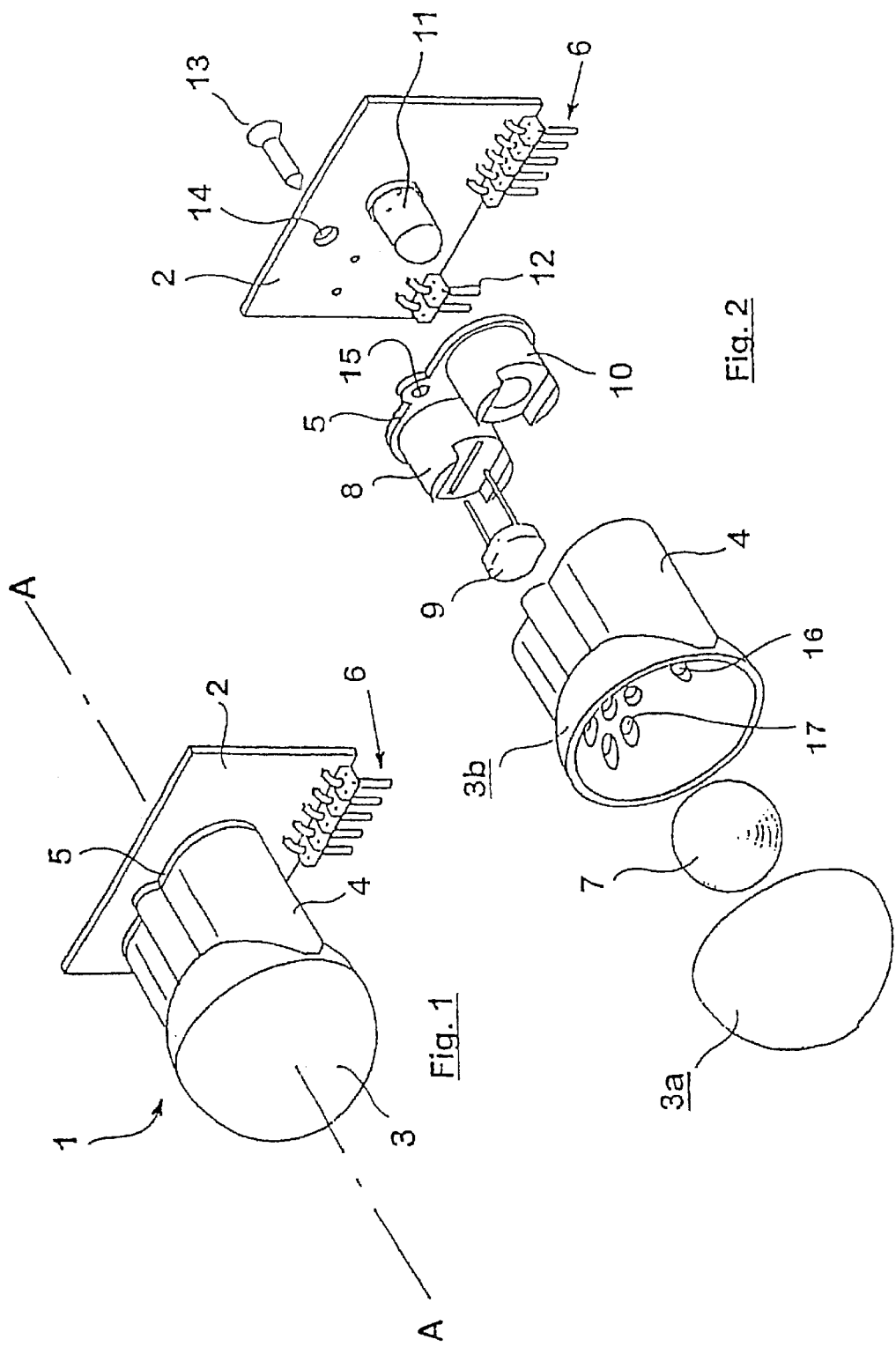

DISPLACEMENT SENSOR IN A SYSTEM SUITABLE FOR CONTROLLING MOVEMENTS AND ALARMS

FIELD OF THE INVENTION

Background of the Invention

The present invention concerns the field of electronics in the area of displacement sensors used in systems for controlling movements and alarms.

The displacement sensors already available in the market are very numerous and use various principles for detecting the displacement, but are for the most part associated with common inconveniences and drawbacks, cases in point being high costs, operational instability at low and high temperatures, sensitivity to such external factors as radio interference, noises, magnetic fields, low mechanical resistance to impact and vibrations, difficult assembly due to the need for installing the sensor in a clearly defined angular position.

The displacement sensor patented by the present applicant in 1983 (Italian Patent No. 1.175.163) comprises a ball in a spherical chamber struck by a beam of ultrasounds that are received and reflected at a constant frequency for as long as the chamber is not moving and reflected at variable frequencies when the chamber, and therefore also the ball, have carried out some movement; this sensor is associated with some of the disadvantages set out above, in particular instability of performance when operating in extremely high or low temperatures or in the presence of external interferences.

The following terms will be conventionally employed in the description that follows:
  i) ball—a body of substantially spherical shape;
  ii) chamber—a hollow and preferably spherical chamber;
  iii) quantity of light—the entity that in physics is defined as the product of the light flux and its duration and which, for the purposes of the present technical invention, may also be understood as the entity that in physics is defined as light intensity, that is to say, as the ratio between the light flux and the solid angle at which the said flux is moving.

SUMMARY OF THE INVENTION

The present invention obviates the drawbacks described above; it is a sensor that in a known manner comprises a ball inserted in a chamber which comprises first and second passages both communicating with the outside and wherein the ball generally finds itself in a state of stable equilibrium, ready to move at even the slightest movement of the chamber and, as characterized in the claims, comprises a source of visible light placed outside the chamber and positioned in such a manner as to illuminate the interior of the chamber through the first of the said passages and an element sensitive to the quantity of light reflected to the outside of the chamber through the second passages (element that hereinafter is to be referred to, more simply, as "light-sensitive element") to detect the said quantity of light, convert it into an electric signal and transfer the said signal to an electronic circuit associated with the sensor, the said electronic circuit being capable of analyzing the said signal, comparing it with pre-selected parameters and deciding whether or not it is to generate at least one pulse that activates a movement control system of the means in which the sensor is installed and activates an alarm system.

The light-sensitive element receives a constant quantity of light reflected by the ball and the interior wall of the chamber for as long as the ball remains still into the chamber or for as long as the atmospheric conditions within the chamber remain constant, while a movement of the ball or changed atmospheric conditions within the chamber will cause a different quantity of light to be reflected onto the light-sensitive element; the latter, in association with the electronic circuit, checks whether the light quantity it has received still falls within a predefined interval; if this quantity is no longer within the said interval, the system sends at least one signal to the location and in the conditions required to trigger the desired control action of the means and the alarm action.

The implementation just described above, which comprises a light source that emits a constant quantity of visible light, is suitable for cases in which the sensor is applied to a means that is in a permanent state of rest, as is the case, for example, of a sensor applied to some fixed structure, such as a rock face or a slope: for as long as the light conditions within the chamber and the quantity of light reflected onto the light-sensitive element remain within the aforesaid interval, the system will not trigger any alarm action.

Preferably, the quantity of visible light emitted by the light source is controlled by a balancing unit comprised in the electronic circuit and comes into operation at the very moment in which an operator activates the sensor applied to the means in question; the said balancing unit will cause the quantity of light emitted by the light source to vary in such a manner as to bring the quantity of light reflected onto the said light-sensitive element back to an appropriately pre-selected value whenever the variations of the said reflected light are due to slow displacements of the chamber or to changes of the atmospheric conditions within the chamber and will do so independently of the inclination at which the sensor is mounted on the means in question; this implementation is suitable, for example, for the case of movements caused by the digging into the asphalt surface of a motor-cycle stand or by the deflation of a tyre of a car.

It will readily be understood that the balancing unit will perform its function irrespective of the position in which the sensor is applied, even when its inclination is far removed from the one that could be said to be a normal inclination, like the one in which the longitudinal axis of the chamber is horizontal; for example, if the sensor, for reasons of space, were to be mounted rotated through 180° with respect to its normal inclination or if the motor vehicle were to be parked on a strongly sloping road. In such conditions the balancing unit will cause the light quantity emitted by the light source to vary in such a way as to bring the quantity of light received by the light-sensitive element back to the appropriately pre-selected value.

The principal advantages of this sensor are its limited cost, its operating stability at temperatures comprised within a wide interval, for example, between +8 C. and −40° C., and its considerable mechanical sturdiness.

The performance of the invented sensor renders it capable of an enormous number of uses that can range from the protection of motor vehicles, the control of movements of the ground, dams, glaciers, buildings (about earthquakes), floating jetties and the alarm systems associated therewith.

When integrated into motor vehicle alarm systems, in particular, the sensor finds an optimal application in the detection of unauthorized displacements. The system, of course, will be calibrated in such a way as not to trigger any alarm in case of the ball undergoing some accidental movement, that is to say, whenever the movements of the ball do not exceed a predetermined number of movements in a predetermined time.

BRIEF DESCRIPTION OF THE DRAWINGS

The invention will now be explained in greater detail by means of an example of embodiment and reference to the attached drawings, of which:

FIG. 1 shows a perspective view,

FIG. 2 provides an exploded view of FIG. 1, and

DETAILED DESCRIPTION OF THE INVENTION

Figure 3:
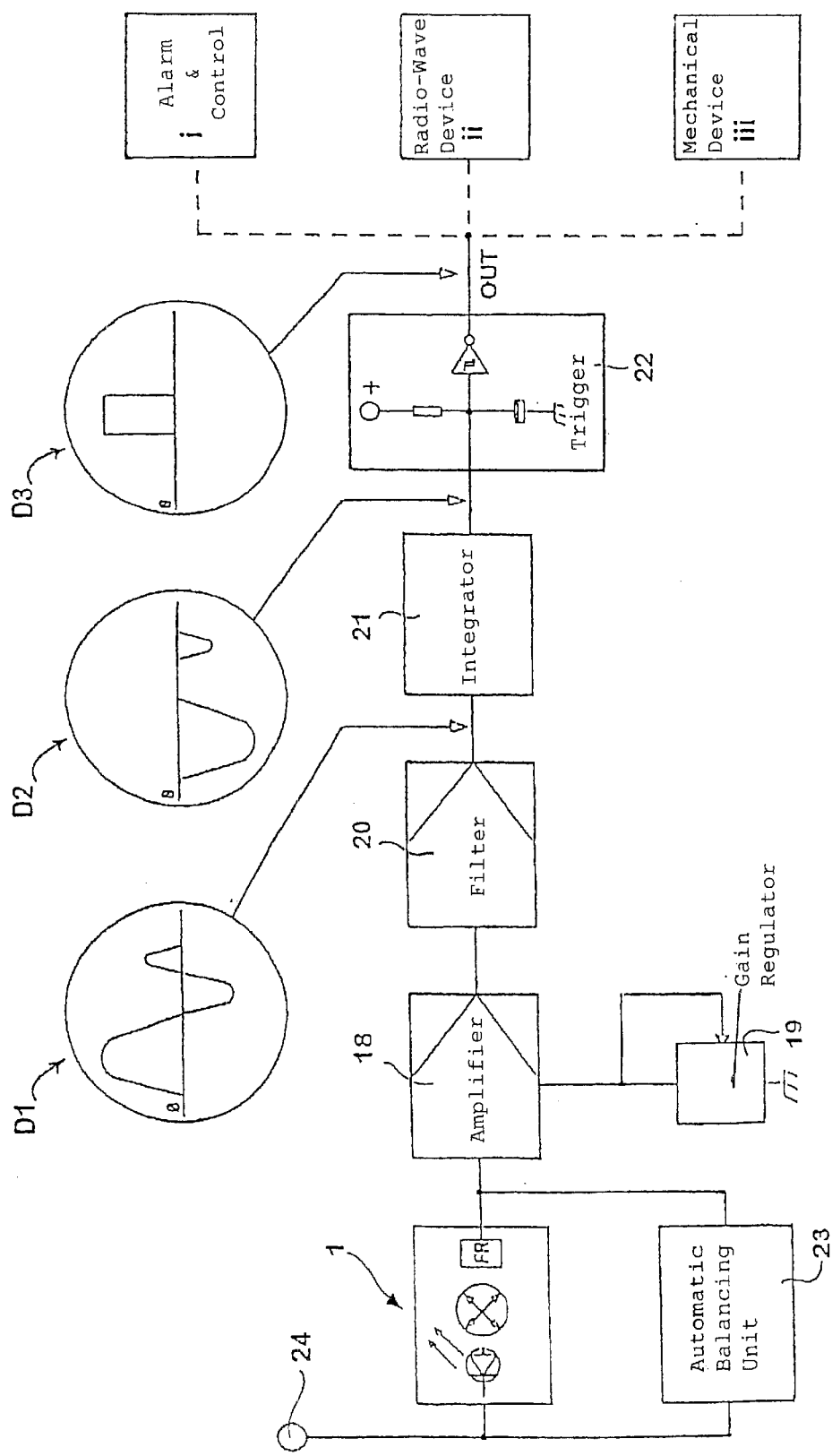
FIG. 3 shows a diagrammatic electronic circuit.

FIG. 1 shows the assembly of the sensor 1 mounted on the panel 2 which contains also the printed circuit supporting the electronic components of the sensor; the reference number 3 indicates the spherical chamber, while 4 denotes the box that contains two groups of openings that provide the passage through which the light enters the chamber and the passage by which the light leaves the chamber, where the former is emitted by a source that emits light in controlled quantities and consists of a visible-light diode (not shown on the drawings), and the latter is light reflected from inside the chamber and seen by a light-sensitive element in the form of a photo-resistance (not shown on the drawings), 5 indicates the base on which there bears the rim of the box 4, and 6 identifies the terminals that connect the sensor printed circuit to the circuit of the system associated with it; lastly, A—A is used to indicate the longitudinal axis of the chamber.

FIG. 2 shows an exploded view of the of the aforesaid panel 2, the two parts 3a and 3b of the spherical chamber 3, the base 5 and the terminals 6 already referred to in FIG. 1, the ball 7 located within the chamber, the support 8 for the photo-resistance 9 chosen as the light-sensitive element capable of detecting the variations of the quantity of light reflected from within the chamber and located within the corresponding part of the box 4, the support on which there is mounted the visible-light diode 11, the earthing terminals 12, the screw 13 for fixing the sensor 1 to the panel 2 through the holes 14 and 15, a group of first openings 16 through which the light emitted by the visible-light diode 11 penetrates into the spherical chamber and a second group of openings 17 through which the light reflected by the ball 7 and the interior walls of the spherical chamber reaches the photo-resistance 9.

FIG. 3 shows the sensor 1, an electronic circuit associated with it and three examples of possible uses of the invention: i) a conventional alarm and control device aboard a motor vehicle; ii) a conventional radio-wave device for sending an alarm signal to a remote station; iii) a conventional system for triggering any kind of mechanical device, cases in point being the opening or closing of a hydraulic valve, the opening or closing of circuit breakers in an electric power plant, the bringing into action of a fire-fighting system. The reference number 18 indicates an amplifier, 19 is a gain regulator, 20 a filter, 21 an integrator, 22 a trigger, 23 the automatic balancing unit, and 24 an oscilloscope for controlling the quantity of light. The unit 23 controls the quantity of light emitted by the visible-light diode in order to keep the quantity of light reflected onto the photo-resistance at the appropriately pre-selected value; a circuit integrated into the balancing unit receives from the photo-resistance the signals correlated with the quantity of light that has struck the said photo-resistance and then acts on the visible-light diode in such a manner as to cause it either to increase or diminish the quantity of light let into the chamber. The circular FIGS. D1, D2 and D3 show, respectively, the variable sinusoidal wave form of the signal at the output side of the filter 20, the merely negative peaks of the signal on the output side of the integrator 21 and the digital signal in the form of a square wave, the upper level of which corresponds to the said appropriately pre-selected value.

It will be appreciated that the circuit integrated into the balancing unit could be conveniently replaced by a microprocessor circuit.

What is claimed is:

1. A displacement sensor (1) in a system suitable for detecting movements of a means and for triggering a control signal or an alarm, said displacement sensor (1) comprising a spherical body (7) which is free to move inside a chamber (3) fixed to said means, said chamber (3) comprising first and second passages (16, 17) both communicating with the outside, characterized in that a source of light (11) is located outside the chamber (3) and positioned in such a manner as to illuminate the interior of said chamber (3) through the first of said passages (16) and an element (9) located outside said chamber (3) is sensitive to the quantity of light reflected to the outside of said chamber (3) through the second passages (17), said element (9) detecting said quantity of light, converting it into an electric signal and transferring said signal to an electronic circuit, this electronic circuit being capable of analyzing said signal, comparing it with pre-selected parameters and deciding whether or not to generate at least one pulse that triggers a control signal or an alarm.

2. A displacement sensor (1) according to claim 1, characterized in that the source of visible light (11) emits a constant quantity of light.

3. A displacement sensor (1) according to claim 1, characterized in that the quantity of visible light emitted by the visible-light source (11) is controlled by a balancing unit operating as from the moment in which an operator activates the sensor and in such a manner as to bring the quantity of light reflected onto the light-sensitive element (9) back to an appropriately pre-selected value whenever this quantity undergoes some variation due to slow displacements of the chamber or changes of the atmospheric conditions within the chamber and independently of the inclination (A—A) at which the sensor (1) is mounted on the said means.

* * * * *